(12) United States Patent
Morrison

(10) Patent No.: US 10,270,311 B2
(45) Date of Patent: Apr. 23, 2019

(54) SUPERCONDUCTING ELECTRICAL MACHINE WITH TWO PART ROTOR WITH CENTER SHAFT CAPABLE OF HANDLING BENDING LOADS

(71) Applicant: Darrell Morrison, Eagle Lake, MN (US)

(72) Inventor: Darrell Morrison, Eagle Lake, MN (US)

(73) Assignee: KATO ENGINEERING INC., North Mankato, MN (US)

( * ) Notice: Subject to any disclaimer, the term of this patent is extended or adjusted under 35 U.S.C. 154(b) by 680 days.

(21) Appl. No.: 14/662,084

(22) Filed: Mar. 18, 2015

(65) Prior Publication Data

US 2016/0276896 A1 Sep. 22, 2016

(51) Int. Cl.
| | | |
|---|---|---|
| *H02K 7/00* | (2006.01) | |
| *H02K 55/04* | (2006.01) | |
| *H02K 7/18* | (2006.01) | |
| *F03D 9/25* | (2016.01) | |
| *F03D 80/60* | (2016.01) | |
| *F03D 80/70* | (2016.01) | |
| *F03D 15/20* | (2016.01) | |

(52) U.S. Cl.
CPC ............... *H02K 7/003* (2013.01); *F03D 9/25* (2016.05); *H02K 7/1838* (2013.01); *H02K 55/04* (2013.01); *F03D 15/20* (2016.05); *F03D 80/60* (2016.05); *F03D 80/70* (2016.05); *Y02E 10/725* (2013.01); *Y02E 40/625* (2013.01)

(58) Field of Classification Search
CPC .......... H02K 9/19; H02K 9/193; H02K 9/197; H02K 7/003

USPC .............. 310/52, 53, 54, 55, 60 A, 61
See application file for complete search history.

(56) References Cited

U.S. PATENT DOCUMENTS

| | | | | |
|---|---|---|---|---|
| 4,295,068 | A * | 10/1981 | Gamble | H02K 55/04 |
| | | | | 310/52 |
| 5,880,547 | A * | 3/1999 | Shoykhet | H02K 3/47 |
| | | | | 310/114 |
| 7,466,045 | B2 | 12/2008 | Andres | |
| 7,638,908 | B2 | 12/2009 | Winn | |
| 7,791,229 | B2 | 9/2010 | Goodzeit | |
| 8,084,909 | B2 | 12/2011 | Goodzeit et al. | |
| 2003/0052568 | A1 * | 3/2003 | Howard | H02K 55/04 |
| | | | | 310/261.1 |
| 2008/0001491 | A1 * | 1/2008 | Qu | H02K 19/103 |
| | | | | 310/179 |
| 2008/0067881 | A1 * | 3/2008 | Winn | H02K 55/04 |
| | | | | 310/52 |

(Continued)

FOREIGN PATENT DOCUMENTS

JP WO 2014061189 A1 * 4/2014 ............ H02K 55/04

*Primary Examiner* — Thomas Truong
(74) *Attorney, Agent, or Firm* — Foley & Lardner LLP

(57) ABSTRACT

A superconducting electrical machine includes a rotor and a stator. The stator defines a cavity. The rotor is configured to rotate about a longitudinal axis. The rotor is disposed at least partially within the cavity. The rotor includes a shaft configured to rotate with the rotor, a rotor active section including at least a rotor torque tube and a superconductor, and a first re-entrant end attaching the shaft to the rotor active section. At most a threshold fraction of a bending force applied to the shaft is communicated to the rotor active section.

15 Claims, 13 Drawing Sheets

(56) References Cited

U.S. PATENT DOCUMENTS

| | | | | |
|---|---|---|---|---|
| 2008/0161189 | A1* | 7/2008 | Lewis | H02K 16/02 505/121 |
| 2009/0230690 | A1* | 9/2009 | Bray | H02K 55/06 290/55 |
| 2009/0251014 | A1* | 10/2009 | Goodzeit | H02K 7/003 310/52 |
| 2009/0295168 | A1* | 12/2009 | Meinke | H02K 3/28 290/55 |
| 2010/0259117 | A1* | 10/2010 | Goodzeit | H02K 55/00 310/52 |
| 2015/0270769 | A1* | 9/2015 | Sato | H02K 55/04 505/163 |

* cited by examiner

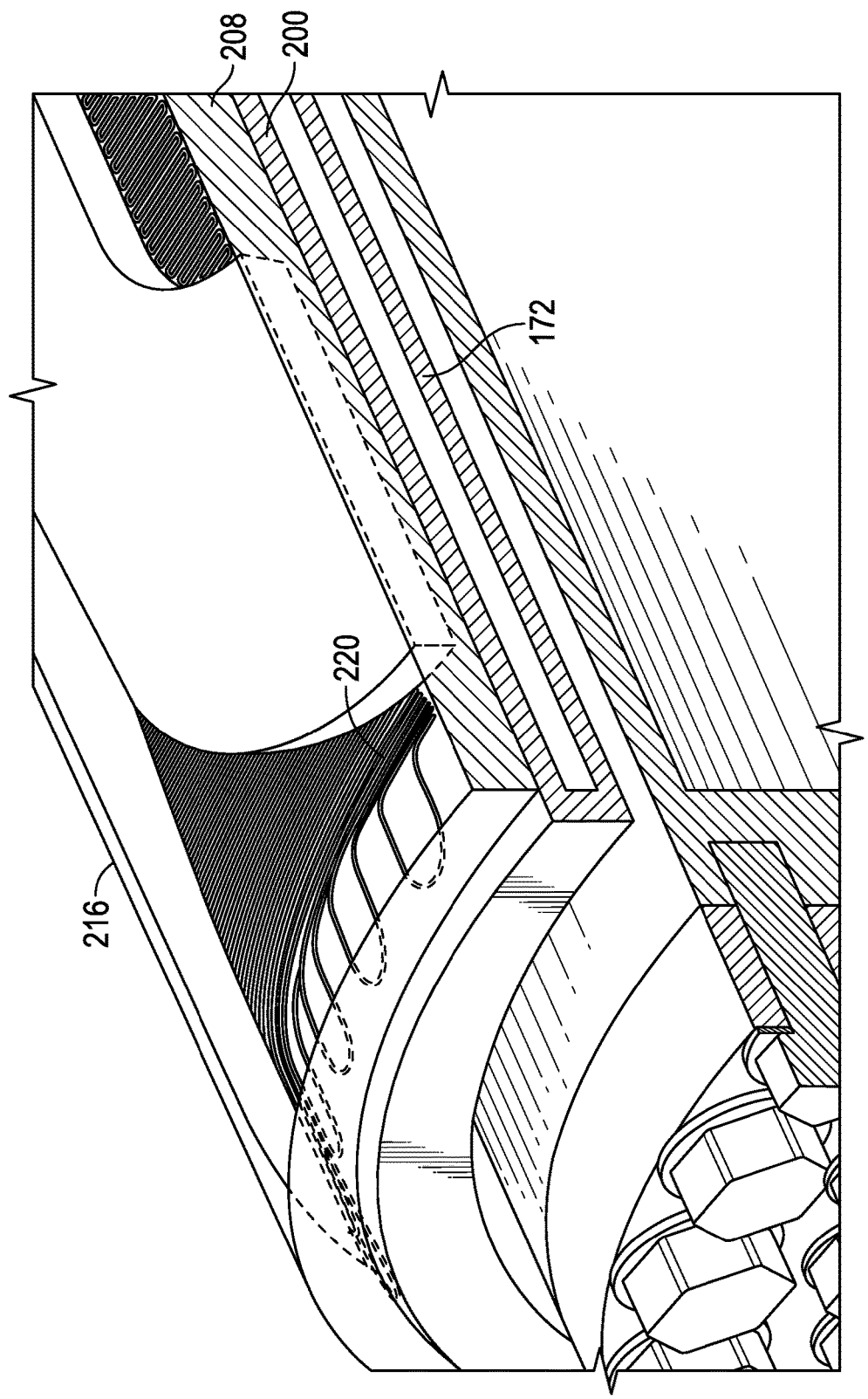

ated by the Us.
SUPERCONDUCTING ELECTRICAL MACHINE WITH TWO PART ROTOR WITH CENTER SHAFT CAPABLE OF HANDLING BENDING LOADS The present disclosure was made with government support under Contract No. DE-EE0005140 awarded by the Us. Department of Energy. The Us. Government has certain right in the present disclosure.

BACKGROUND

The present invention relates generally to the field of electrical machines for energy conversion, such as motors and generators. Motors convert electricity into mechanical energy. Generators generate electricity by converting mechanical energy into electrical energy. A prime mover, such as an engine driving a rotating shaft, provides the mechanical energy. A rotor having permanent magnets or electromagnets rotates with the rotating shaft, generating a magnetic field that causes electricity to be generated in a stationary stator.

Superconducting electrical machines, such as a superconducting generator, use the principle of superconductivity to significantly reduce the electrical resistance in the conductors of the generator. Superconductivity requires maintaining the conductors at very low temperatures. Forces received from the prime mover can cause structural damages to a superconducting electrical machine, and the damages may be exacerbated by the very low temperatures.

SUMMARY OF THE INVENTION

One embodiment of the invention relates to a rotor. The rotor is configured to rotate about a longitudinal axis. The rotor includes a shaft disposed along the longitudinal axis. The rotor also includes a first re-entrant end attaching the shaft to a rotor active section. At most a threshold fraction of a bending load applied to the shaft is communicated to the rotor active section.

Another embodiment relates to a superconducting electrical machine. The superconducting electrical machine includes a stator disposed coannular with a longitudinal axis. The stator defines a cavity. The superconducting electrical machine also includes a rotor configured to rotate about the longitudinal axis. The rotor is disposed at least partially within the cavity. The rotor includes a shaft configured to rotate with the rotor, a rotor active section including at least a rotor torque tube and a superconductor, and a first re-entrant end attaching the shaft to the rotor active section. At most a threshold fraction of a bending load applied to the shaft is communicated to the rotor active section.

Another embodiment relates to a system for generating electricity. The system includes a prime mover configured to rotate a shaft about a longitudinal axis. The system also includes a superconducting electrical machine, including a stator disposed coannular with the longitudinal axis, and a rotor configured to rotate about the longitudinal axis. The rotor includes a shaft disposed along the longitudinal axis and a rotor active section surrounding and coannular with the rotor torque tube, wherein a first re-entrant end attaches the shaft to the rotor active section. At most a threshold fraction of a bending load applied to the shaft by the prime mover is communicated to the rotor active section.

Alternative embodiments relate to other features and combinations of features as may generally be recited in the claims.

BRIEF DESCRIPTION OF THE DRAWINGS

The invention will become more fully understood from the following detailed description, taken in conjunction with the accompanying figures, in which like reference numerals refer to like elements.

FIG. 14 is a cutaway view of the active sections of a rotor of a superconducting electrical machine in accordance with one embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, superconducting electrical machines include a stator supported in a stator frame and a rotor configured to rotate in a cavity defined by the stator. The rotor and stator are each surrounded by a cryostat to maintain a vacuum at superconducting temperatures around the rotor and the stator. A cryocooler provides coolants to the rotor and the stator to maintain the rotor and the stator at superconducting temperatures. The rotor may be rotated using mechanical energy from a prime mover (e.g., engine, gas turbine, wind turbine, etc.), or may use electricity to drive a load. The rotor and stator each include active sections in which superconductive processes may take place, in which superconducting temperatures may be achieved, and/or which are involved in the electromagnetic behavior of the superconducting electrical machine. The rotor is configured to rotate about a longitudinal axis. A shaft, which may be received from the prime mover, rotates the rotor. The rotor includes re-entrant ends attaching the shaft to an active section of the rotor, such as a rotor torque tube. The re-entrant ends provide high thermal resistance pathways to help maintain the superconducting temperatures. The re-entrant ends need to be flexible to avoid high thermal stresses. The re-entrant ends are separately attached to the active section, which may undergo thermal contraction, and each re-entrant end is carried by its own bearing. The strong, stiff center shaft helps the superconducting electrical machine to carry bending loads, while providing a secure mounting for outboard ends of the re-entrant ends. The center shaft may remain at or close to ambient temperature, such that it undergoes minimal thermal contraction, allowing for easier bearing placement and the use of alloys that could otherwise be negatively affected by low temperatures. A bending load applied to the shaft is communicated to the superconducting electrical machine active section by at most a threshold fraction of the bending load.

Figure 1:
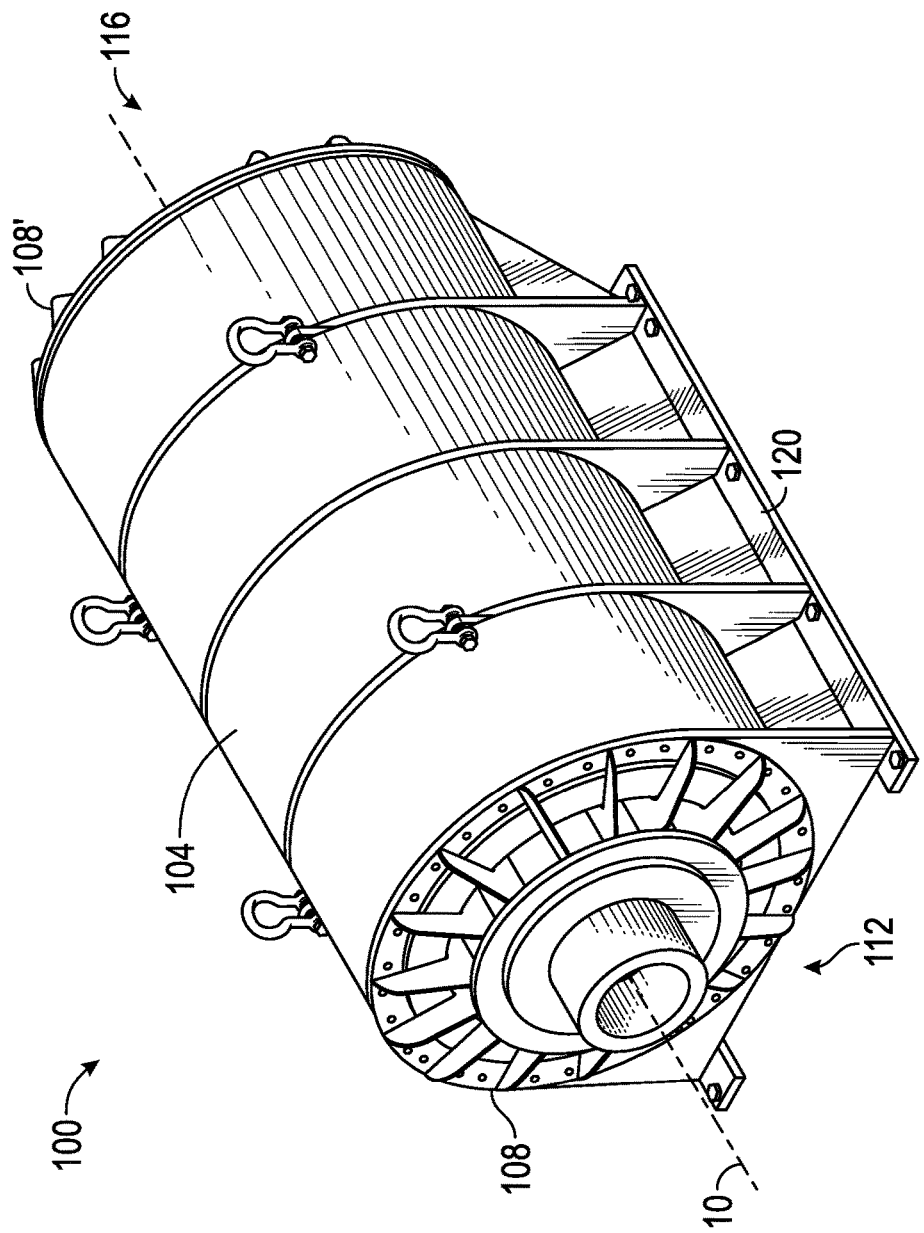
FIG. 1 is a perspective view of a superconducting electrical machine, in accordance with one embodiment.

Referring to FIG. 1, in some embodiments, a superconducting electrical machine 100 includes a stator frame 104. Stator frame 104 may be a housing that supports a stator (e.g., stator 160 shown in FIG. 7). In some embodiments, the stator frame 104 includes a shape that is substantially a cylindrical shell. The superconducting electrical machine 100 may also include a base 120 attached to the stator frame 104 to support the weight of the superconducting electrical machine 100.

Superconducting electrical machine 100 may include a pair of bracket assemblies 108, 108' disposed at a drive end 112 and a non-drive end 116 of the superconducting electrical machine 100. The pair of bracket assemblies 108, 108' may include a pair of bearings to support a rotor and accommodate rotation of the rotor about a longitudinal axis 10 (see, e.g., rotor 150 shown in FIGS. 5-7). A longitudinal axis 10 may pass through the superconducting electrical machine 100 and perpendicular to a pair of planes substantially defined by the pair of bracket assemblies 108, 108'.

A drive end 112 is an end region of a superconducting electrical machine 100 proximate to a prime mover, such as a wind turbine, and at which a shaft (e.g. shaft 152 shown in FIG. 3) may be received from the prime mover. A non-drive end 116 is an end region of the superconducting electrical machine 100 located on an opposite end of the superconducting electrical machine 100 from the drive end 112.

Figure 2:
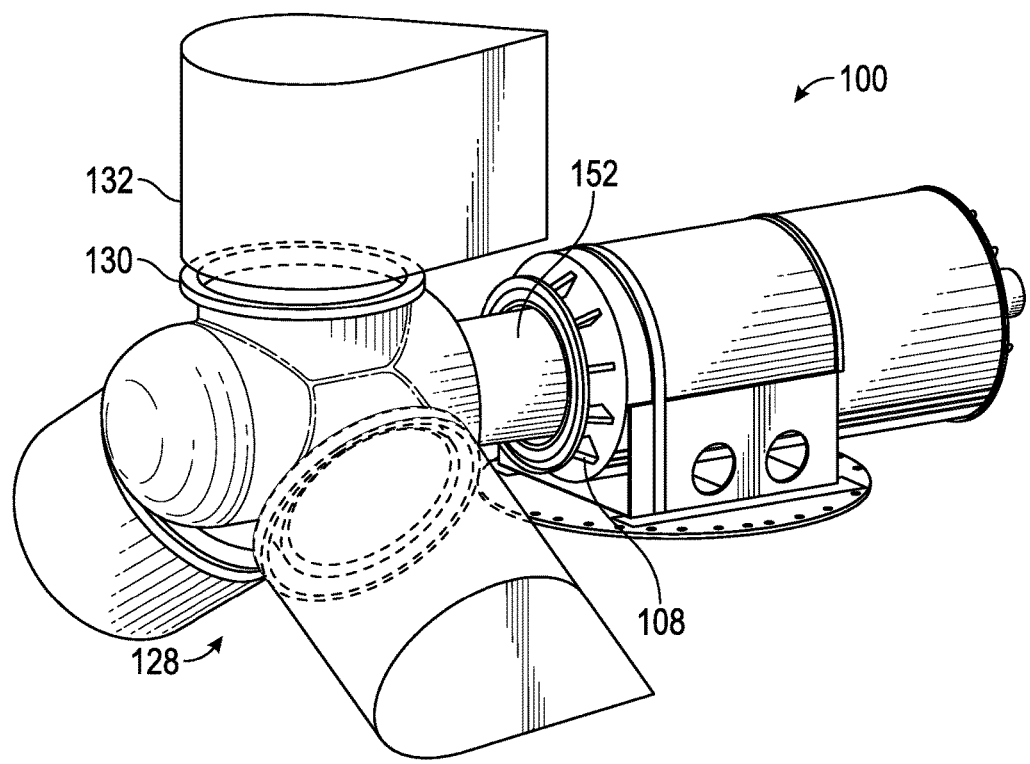
FIG. 2 is a perspective view of a superconducting electrical machine driven by a wind turbine, in accordance with one embodiment.
Figure 3:
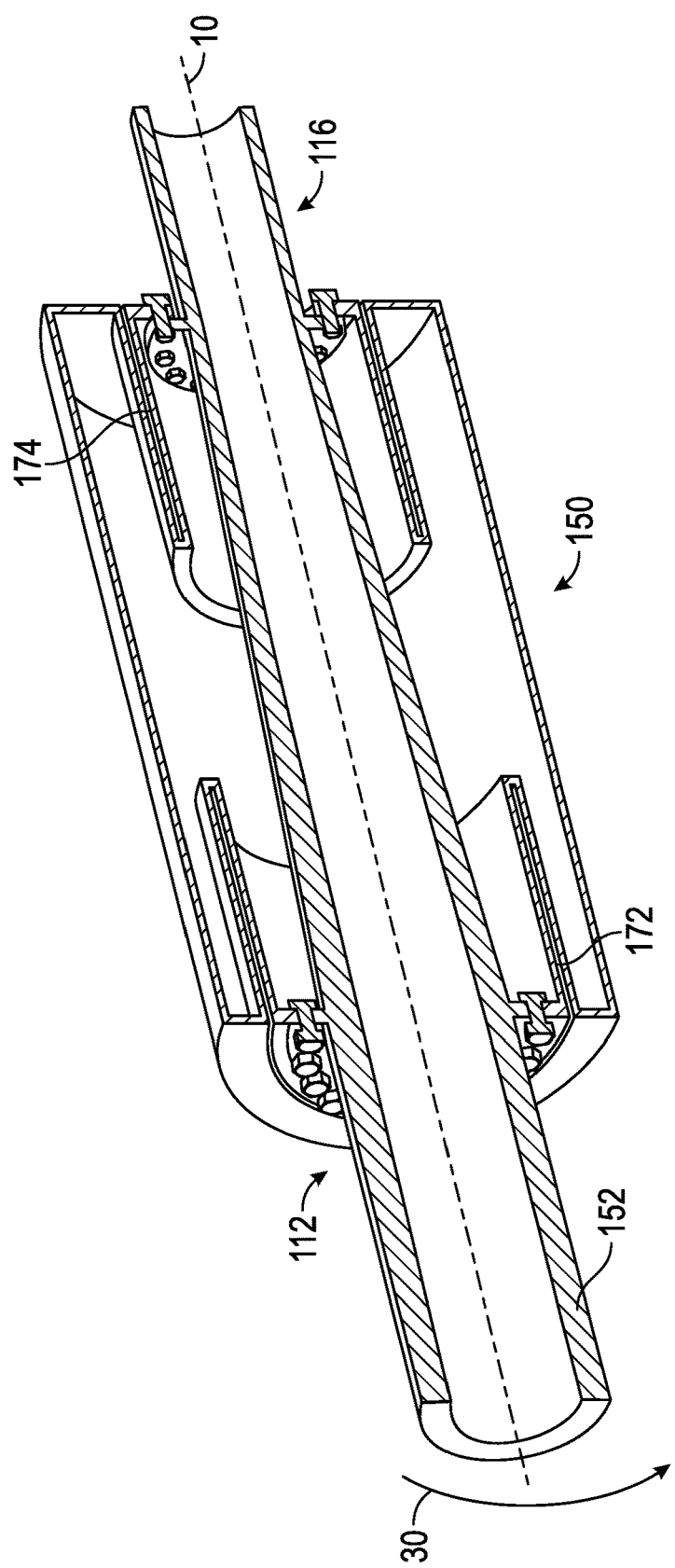
FIG. 3 is a cross-sectional view of a rotor of a superconducting electrical machine in accordance with one embodiment.

Referring to FIGS. 2-3, in some embodiments, a superconducting electrical machine 100 is driven by a shaft 152 coupled to a wind turbine 128. The wind turbine 128 may include a mainframe supported by a tower. In some embodiments, including but not limited to offshore wind applications, the tower may be configured to stand on an ocean floor and withstand tidal action, storms, and other physical impacts of both continuous and transitory natures. In some embodiments, including but not limited to land-based wind applications, the tower may be configured to stand on any kind of terrain and withstand storms and other physical impacts of both continuous and transitory natures.

In various embodiments, a superconducting electrical machine 100 is driven by various prime movers. For example, the superconducting electrical machine 100 may be driven by an engine, such as an engine using oil, gasoline, diesel, or other fossil fuels as a fuel source. The superconducting electrical machine 100 may be driven by a gas turbine. The superconducting electrical machine 100 may be driven by a nuclear reactor steam turbine, such as in a naval submarine. The superconducting electrical machine 100 may be used in various naval contexts, such as with oil, gasoline, or diesel engines; with gas turbines; in coordination with a propulsion motor benefiting from the high specific torque of the superconducting electrical machine 100; etc.

In some embodiments, a wind turbine 128 includes a plurality of blades 132 configured to rotate a shaft 152 when acted upon by a force, such as a force generated by wind. The plurality of blades 132 may extend radially from a central hub 130 which is coupled to the shaft 152, and the plurality of blades 132 may rotate the central hub 130 and in turn rotate the shaft 152 when acted upon by a force. The plurality of blades 132 may include three blades 132 arranged in a circular configuration. In some embodiments, the plurality of blades 132 are arranged in a circular configuration and spaced equidistantly from each other, the plurality of blades being spaced by approximately 60 degrees from each other.

In some embodiments, a bending load is transmitted from a prime mover, such as wind turbine 128, to a shaft 152 which rotates a rotor 150 of a superconducting electrical machine 100. A bending load may be any load applied to the shaft 152 not involved in the rotation of the shaft 152 about the longitudinal axis 10 to rotate the rotor 150 and drive the superconducting electrical machine 100. For example, a bending load may be a load applied in a direction not parallel to the longitudinal axis 10. A bending load may lead to a bending moment which may lead to the shaft 152 no longer being parallel to the longitudinal axis 10, or which may lead to the shaft 152 rotating in a plane containing the longitudinal axis 10. A bending load may be induced by action of the wind turbine 128 on the shaft 152; a bending load may be induced by forces remote from the wind turbine 128 acting on the wind turbine 128, which are then transmitted to the shaft 152.

In some embodiments, a shaft 152 may pass directly through and be supported by a bracket and a bearing at the drive end 112 of the superconducting electrical machine 100, into a rotor 150. The shaft may at least partially coincide with a longitudinal axis 10. The shaft 152 may be coupled to the rotor 150 to directly rotate the rotor 150 and drive the superconducting electrical machine 100. The shaft 152 may be attached to a rotor active section via re-entrant ends (see, e.g., rotor active section 154 shown in FIG. 13B; re-entrant ends 172, 174 shown in FIG. 15A-15B). The shaft 152 may pass through to be supported by a bracket (e.g., bracket 108' shown in FIG. 1) and a bearing at the non-drive end 116 of the superconducting electrical machine 100.

In some embodiments, the shaft 152 acts as a strong, stiff center in the superconducting electrical machine 100 to carry bending loads. The shaft 152 may provide a secure mounting for re-entrant ends 172, 174. In some embodiments, the shaft 152 remains relatively close to ambient temperature, such that the shaft 152 undergoes low amounts of thermal contraction. As such, the shaft 152 minimizes the need for complex bearing systems to accommodate thermal contraction in the shaft, while also allowing for the use of alloy materials in the superconducting electrical machine 100 that would otherwise be negatively impacted by low temperatures.

Figure 13A:
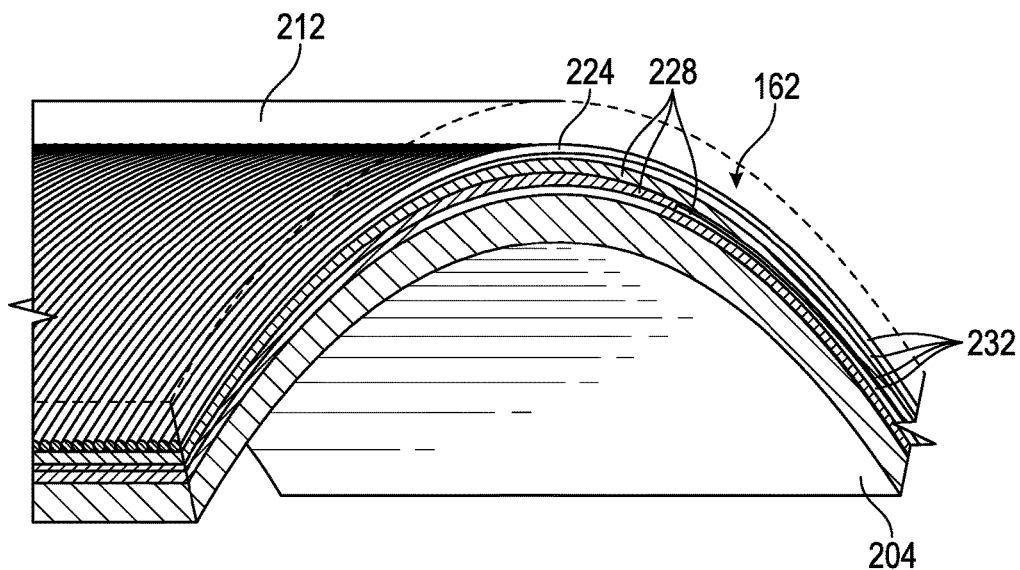
FIG. 13A is a partial view of the active section and various layers of a stator of a superconducting electrical machine in accordance with one embodiment.
Figure 13B:
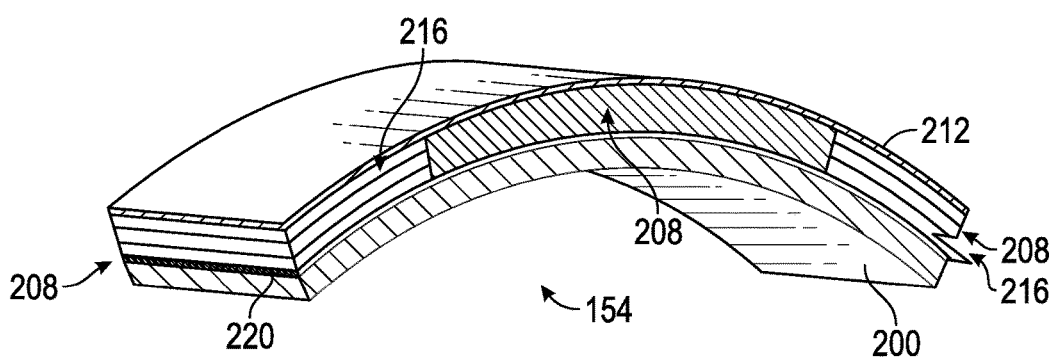
FIG. 13B is a partial view of the active section and various layers of a rotor of a superconducting electrical machine in accordance with one embodiment.

The shaft 152 may transfer a torque to an active section of the rotor 150 (e.g., rotor active section 154 shown in FIG. 13B, etc.). In some embodiments, the shaft 152 rotates the rotor 150 at a constant rate. In some embodiments, the superconducting electrical machine 100 is configured for variable speed operation. A voltage regulator may be used to account for variations voltage due to variations in the rotation rate of the shaft 152. In various embodiments, the shaft 152 may be configured to rotate the rotor 150 at various rates or ranges of rates (e.g., between zero and 1000 revolutions per minute; between zero and 100 revolutions per minute; between zero and 10 revolutions per minute; etc.). In some embodiments, the shaft 152 is configured to rotate the rotor 150 at approximately 10 revolutions per minute.

Referring further to FIG. 3, a rotor 150 is shown. The rotor 150 is configured to rotate about a longitudinal axis 10. A re-entrant drive end 172 is disposed at a drive end 112 region of the rotor 150, and a re-entrant non-drive end 174 is disposed at a non-drive end 116 region of the rotor 150. At most a threshold fraction of a bending load, such as a bending load 30 applied to the shaft 152 of the rotor 150, is communicated to portions of the rotor 150 such as rotor active section 154. In some embodiments, at most a threshold fraction of a bending load applied to the shaft 152 is communicated to a rotor torque tube 200 or other active portions of the rotor 150. In various embodiments, the threshold fraction may be a fraction such as one tenth, one hundredth, one thousandth, etc. In some embodiments, a bending load is only communicated to re-entrant ends 172, 174, and to bearings disposed at the drive end 112 region and non-drive end region 116 within bracket assemblies (e.g., bracket assemblies 108, 108' shown in FIG. 1).

In some embodiments, the bending load may be transmitted from the shaft 152 to a pair of bracket assemblies disposed at the drive end 112 and the non-drive end 116 of the superconducting electrical machine 100 (e.g., bracket assemblies 108, 108' shown in FIG. 1). The bracket assemblies 108, 108' may transmit the bending load to a stator frame 104, and in turn to a component remote from the superconducting electrical machine 100, such as a mainframe. As such, at most a threshold fraction of the bending load is communicated to active components of the rotor 150 such as the rotor torque tube 200. In some embodiments, at least one of the stator frame 104 and the mainframe is attached to a suspension, dampening system, etc. The suspension, dampening system, etc., may absorb at least some of a bending load in order to transmit the bending load to an environment remote from the superconducting electrical machine 100.

In some embodiments, a re-entrant end (e.g., re-entrant drive end 172, etc.) includes a re-entrant length. The length may be tailored based on a balance between a stiffness for the re-entrant end and a resistance to heat transfer through the re-entrant end. The length may be tailored relative to a length of other portions of a rotor 150. For example, the length may be tailored based on factors such as a maximizing a thermal pathway in order to provide maximum thermal resistance, and maintaining active section support for various forces (e.g., maintaining flexibility for accommodating thermal expansion and/or thermal contraction). For example, the re-entrant length may be at least one third of a length of a rotor torque tube (see, e.g., rotor torque tube 200 shown on FIG. 13B).

In some embodiments, a re-entrant end (e.g., re-entrant end 172, etc.) is configured to have a first temperature at a first point and a second temperature at a second point. The first point may be a point proximate to where the re-entrant end 172 attaches to a shaft 152. The first temperature may be approximately a temperature of the shaft 152 close to a room temperature (e.g. 293 Kelvin, 298 Kelvin, etc.). The second point may be a point proximate to where the re-entrant end 172 attaches to a rotor torque tube 200. The second temperature may be approximately a superconducting temperature achieved in the rotor torque tube 200 or other components of an active section of the rotor 150 (see, e.g., rotor active section 154 shown in FIG. 13B). In some embodiments, a cooling load required for drawing heat from the active section 154 of the rotor 150 is reduced, due to a length of the re-entrant end 172 corresponding to a pathway for heat transfer such that the first temperature is a room temperature and the second temperature is a superconducting temperature, increasing the cooling efficiency of the superconducting electrical machine 100. In some embodiments, the second point is at a superconducting temperature, mitigating temperature gradients in a superconductor such as rotor windings, and in turn minimizing negative effects of temperature gradients such as stress concentrations, etc., in the rotor windings (see, e.g., rotor windings 216 shown in FIGS. 15A-15B, etc.). A superconducting temperature may be any temperature at which superconductive processes occur in windings (e.g. electrical conduction with zero electrical resistance). A superconducting temperature may be a temperature greater than zero Kelvin and less than 93 Kelvin; greater than or equal to 4 Kelvin and less than or equal to 77 Kelvin; etc. A superconducting temperature may include cryogenic temperatures.

In some embodiments, a rotor 150 or a portion of a rotor 150 (e.g., rotor windings 216, rotor torque tube 200, etc.) undergoes a volume change due to thermal expansion or contraction due to a change in temperature from a first temperature to a second temperature. The re-entrant end 172 may be configured to compensate for the volume change. For example, portions of a rotor 150 at superconducting temperatures may undergo thermal contraction. Ordinarily, thermal contraction may cause axial stress (e.g., stress in a direction substantially parallel to a longitudinal axis 10) on other portions of the rotor 150 or the superconducting electrical machine 100. The re-entrant end 172 may provide an extended pathway for conduction of thermal energy between a portion of the rotor 150 at a superconducting temperature and a portion of the rotor 150 (e.g. shaft 152) exposed to a room temperature. As such, a temperature gradient between the superconducting temperature and the room temperature does not cause a significant stress.

Generally, the term volume change may encompass any change in a volume of a superconducting electrical machine or a component of a superconducting electrical machine (e.g. a rotor, a stator, superconducting windings, etc.). A volume change may refer to any change in dimensions of a superconducting electrical machine or a component of a superconducting electrical machine, such as an expansion or a contraction. A volume change may be a thermal volume change induced by a change in temperature of a material. An expansion or a contraction may occur in one dimension, two dimensions, or three dimensions. An expansion or contraction may occur in some dimensions at some temperatures, and in other dimensions at other temperatures. An expansion or contraction may be measured by various techniques, such as by comparing a change in a dimension of a material (e.g. length, etc.), to an initial dimension of the material. A material property such as a thermal expansion coefficient may be used regarding volume changes for a material. The thermal expansion coefficient may correspond to various volume changes, including a contraction that occurs when the temperature of a material decreases and an expansion that occurs when the temperature of a material increases.

Figure 4:
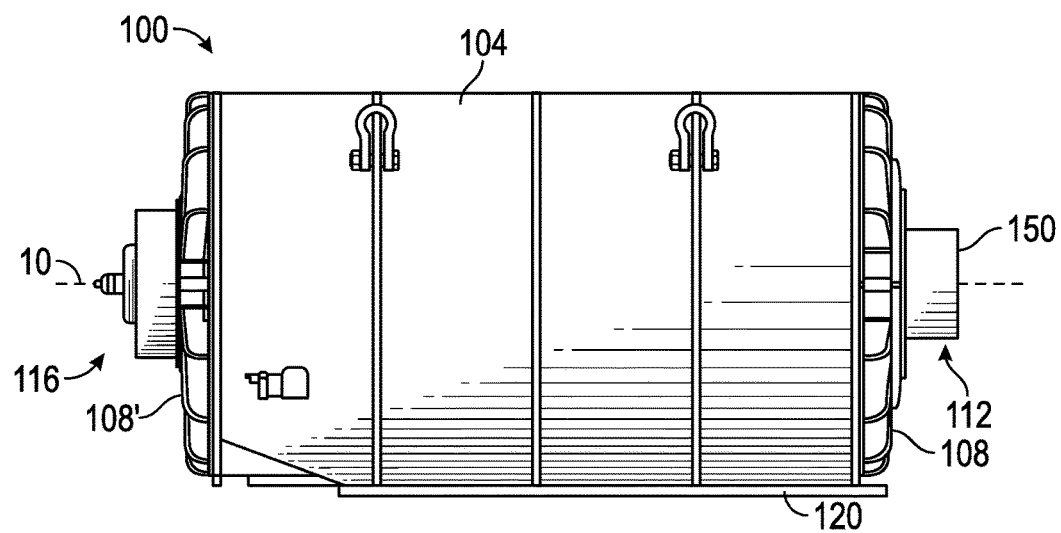
FIG. 4 is a side view of the superconducting electrical machine of FIG. 1.

Referring to FIG. 4, a side view of a superconducting electrical machine 100 is shown. The superconducting electrical machine 100 may include a stator frame 104, a pair of bracket assemblies 108, 108' disposed at a drive end 112 and at a non-drive end 116 of the superconducting electrical machine 100, and a base 120 disposed below the stator frame 104 to support the superconducting electrical machine 100. A longitudinal axis 10 may pass through the superconducting electrical machine 100. The superconducting electrical machine 100 may include a rotor 150, the rotor 150 being coannular with the stator frame 104. The rotor 150 may be supported in the superconducting electrical machine 100 by the pair of bracket assemblies 108, 108'.

Figure 5:
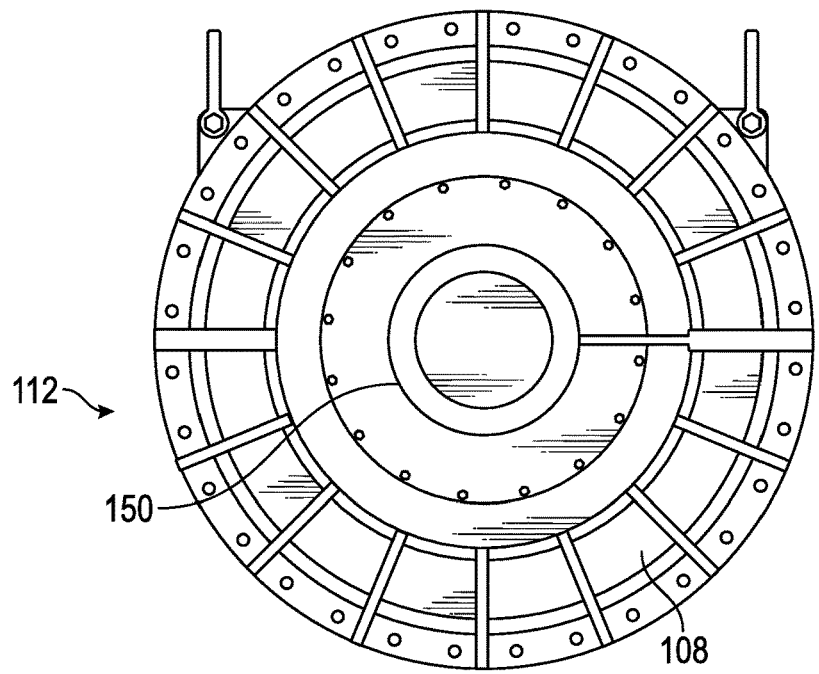
FIG. 5 is an end view of the drive end of the superconducting electrical machine of FIG. 1.

Referring to FIG. 5, an end view of a superconducting electrical machine 100 including a drive end 112 is shown. The drive end 112 may be located at an end region of the superconducting electrical machine 100 proximate to a prime mover, such as a wind turbine. Superconducting electrical machine may include a bracket assembly 108 disposed at the drive end 112. The bracket assembly 108 may surround and be coannular with a bearing. In some embodiments, the bearing is an anti-friction bearing, and the bearing accommodates rotation of a rotor 150. The bearing may surround and be coannular with the rotor 150. In some embodiments, the bearing receives a shaft from a prime mover for rotating the rotor 150 (e.g., shaft 152 shown in FIG. 3).

Figure 6:
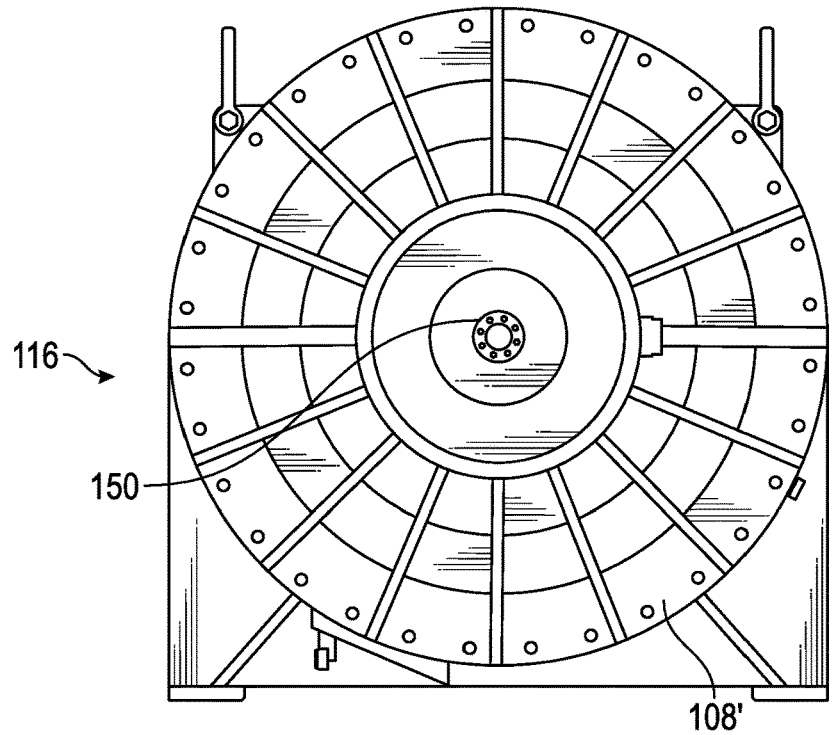
FIG. 6 is an end view of the non-drive end of the superconducting electrical machine of FIG. 1.

Referring to FIG. 6, an end view of a superconducting electrical machine 100 including a non-drive end 116 is shown. The non-drive end 116 may be located at an end region of the superconducting electrical machine 100 distal from a prime mover, such as a wind turbine, and opposite from a drive end (e.g. drive end 112 shown in FIG. 5). Superconducting electrical machine 100 may include a bracket assembly 108' disposed at the non-drive end 116. The bracket assembly 108' may surround and be coannular with a bearing. In some embodiments, the bearing is an anti-friction bearing, and the bearing accommodates rotation of a rotor 150. The bearing may surround and be coannular with the rotor 150.

Figure 7:
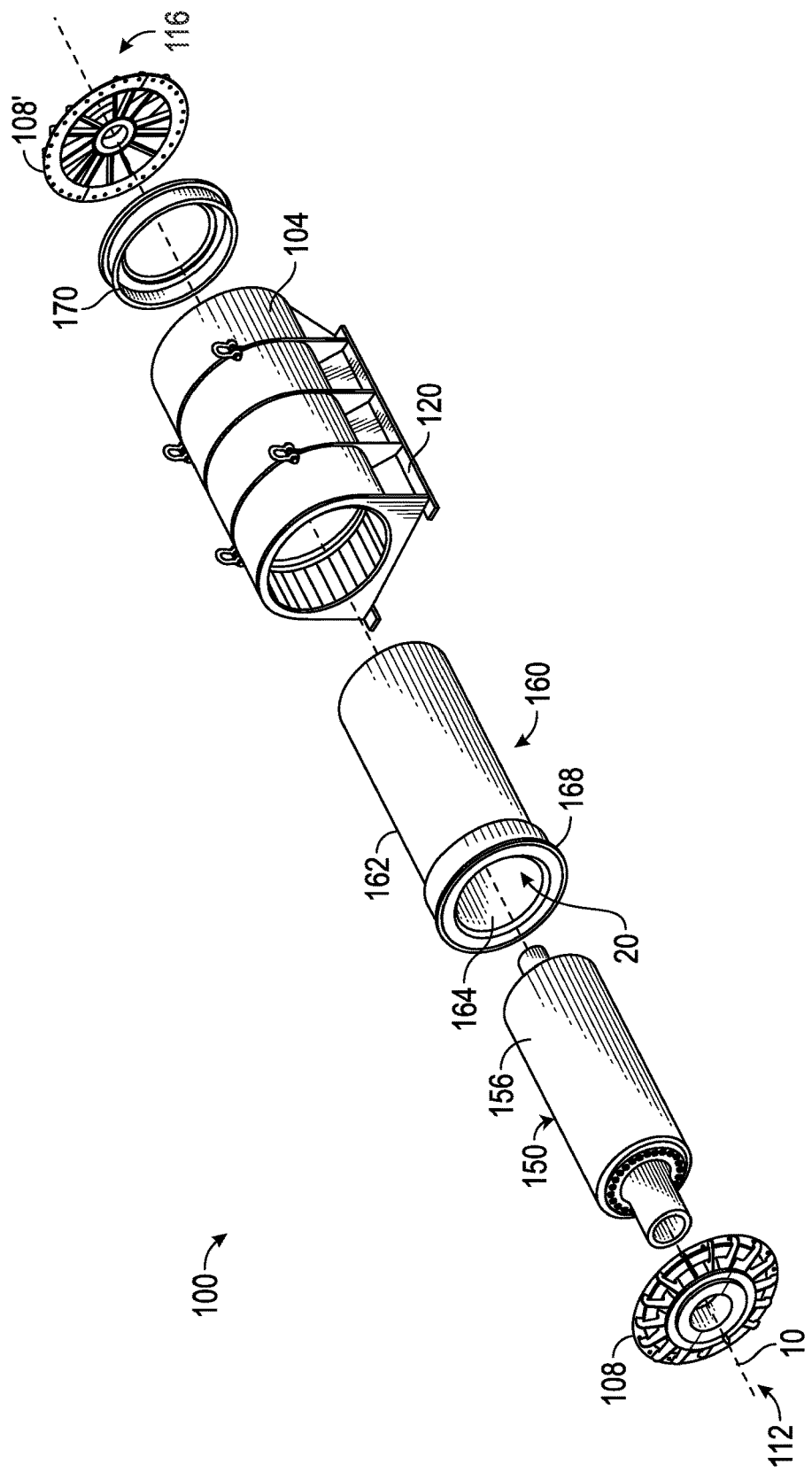
FIG. 7 is an exploded perspective view of the superconducting electrical machine of FIG. 1.

Referring to FIG. 7, an exploded view of various components of a superconducting electrical machine 100 is shown. The superconducting electrical machine 100 may include a stator frame 104 attached to a base 120. The superconducting electrical machine 100 may include a pair of bracket assemblies 108, 108' disposed at a drive end 112 and a non-drive end 116 of the superconducting electrical machine 100. The superconducting electrical machine 100 may include a rotor 150 supported by the bracket assemblies 108, 108' and which rotates about a longitudinal axis 10.

The superconducting electrical machine 100 may include a stator 160. As shown in FIG. 7, the stator 160 includes an active section 162, and superconductive processes may occur in the active section 162. FIG. 7 also shows a stator non-drive re-entrant end 170 disposed at a non-drive end 116 of the stator 160. Re-entrant ends, such as the stator non-drive re-entrant end 170, provide an elongated pathway for thermal conduction between the stator 160 and an environment surrounding the superconducting electrical machine 100, improving the ability of the superconducting electrical machine 100 to maintain the superconducting temperatures required for superconductive processes to occur. Re-entrant ends, such as the stator non-drive re-entrant end 170, also provide radial and axial flexibility to accommodate thermal expansion and/or thermal contraction of the active section 162. An inner surface of the stator 160 defines a cavity 20 in which the rotor 150 may be disposed. In some embodiments, the inner surface is defined by a bore tube of a stator cryostat 164 which maintains a vacuum environment within the stator 160. The stator cryostat 164 may be composed of a bore tube assembly including a cylindrical tube and end caps, the stator re-entrant ends 168, 170, and the stator frame 104. The stator cryostat 164 components may be sealed (e.g., hermetically sealed) and/or welded together to complete the stator cryostat 164 in order to provide the vacuum environment for the stator 160.

An outer surface of the rotor 150 may be defined by a rotor cryostat 156 which maintains a vacuum environment within the rotor 150. Cryostats, such as the stator cryostat 164 and the rotor cryostat 156, improve the ability of the superconducting electrical machine 100 to maintain a superconducting environment, by providing a vacuum environment surrounding each of the stator 160 and the rotor 150. In some embodiments, an air gap remains between the stator cryostat 164 and the rotor cryostat 156 after the rotor 150 has been positioned within the cavity 20 (see, e.g., air gap 184 shown in FIGS. 9A-9B).

In some embodiments, a rotor 150 is rotatably coupled to a shaft and may be rotated by the shaft about a longitudinal axis 10 when the shaft rotates (see, e.g., shaft 152 shown in FIG. 3). In some embodiments, the shaft 152 is continuous with a shaft received from a prime mover such as a wind turbine (see generally FIGS. 2-3). The rotor 150 may be supported in the superconducting electrical machine 100 by a pair of bearings which surround and are coannular with the rotor 150, and are disposed at the drive end 112 and the non-drive end 116 of the superconducting electrical machine 100. A pair of bracket assemblies 108, 108' may surround and support the pair of bearings, and in turn, support the rotor 150. The rotor 150 may include a rotor active section in which superconductive processes occur (see, e.g., rotor active section 154 shown in FIG. 13B). The rotor 150 may include a rotor re-entrant drive end and a rotor re-entrant non-drive end (see, e.g., re-entrant ends 172, 174 shown in FIGS. 15A-15B). The re-entrant ends 172, 174 may provide an extended path along which thermal conduction occurs from the rotor to an environment surrounding the superconducting electrical machine 100, which increases a resistance to thermal conduction, thus facilitating maintaining the rotor active section 154 at or below a superconducting temperature. Re-entrant ends, such as the rotor re-entrant drive end 172 and a rotor re-entrant non-drive end 174, also provide radial and axial flexibility to accommodate thermal expansion and/or thermal contraction of the active section 154.

When a superconducting electrical machine 100 is assembled and/or being operated, a stator 160 may be disposed generally surrounding and coannular with the rotor 150. The stator 160 may be supported by a stator frame 104. The stator 160 may include a stator re-entrant drive end 168 and a stator re-entrant non-drive end 170. The re-entrant ends 168, 170 may provide an extended path along which thermal conduction occurs between the stator active section 162 and an environment surrounding the superconducting electrical machine 100, which increases a resistance to thermal conduction, thus facilitating maintaining the stator active section 162 at or below a superconducting temperature.

Figure 9A:
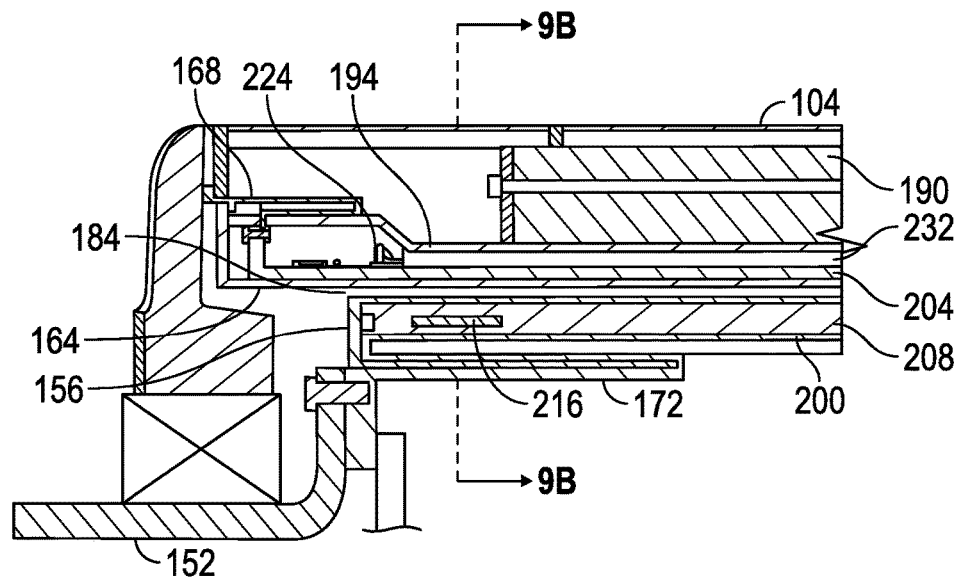
FIG. 9A is a sectional view of a superconducting electrical machine in accordance with one embodiment.
Figure 9B:
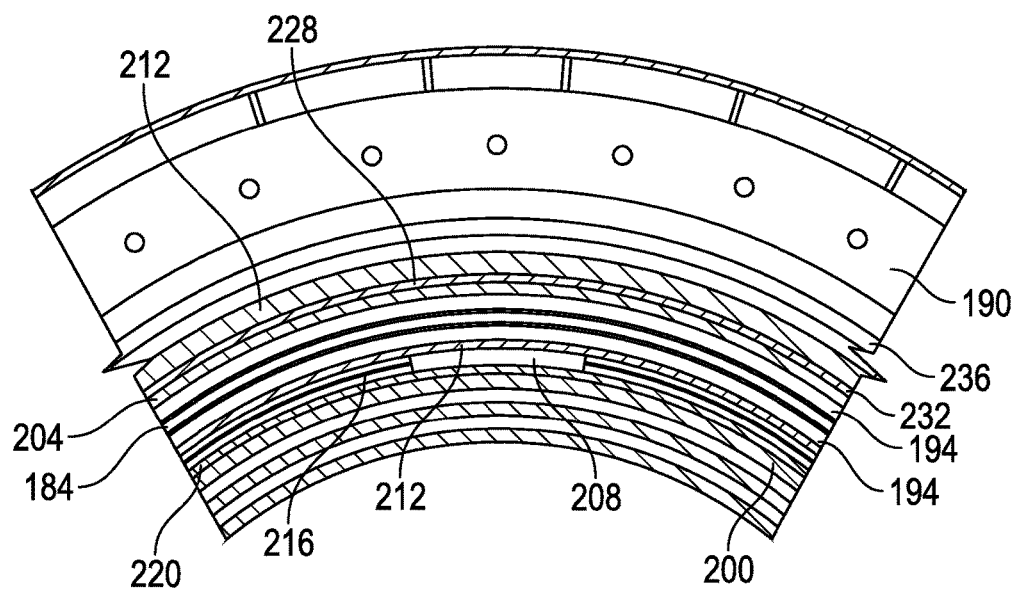
FIG. 9B is a detail view of the superconducting electrical machine of FIG. 10A.

The stator 160 may be surrounded by an electromagnetic shield which minimizes communication of electrical signals and energy across a boundary of the stator frame 104 and the superconducting electrical machine 100 (see, e.g., electromagnetic shield 190 shown in FIGS. 9A-9B). In some embodiments, the electromagnetic shield 190 includes a laminated shield.

Figure 8:
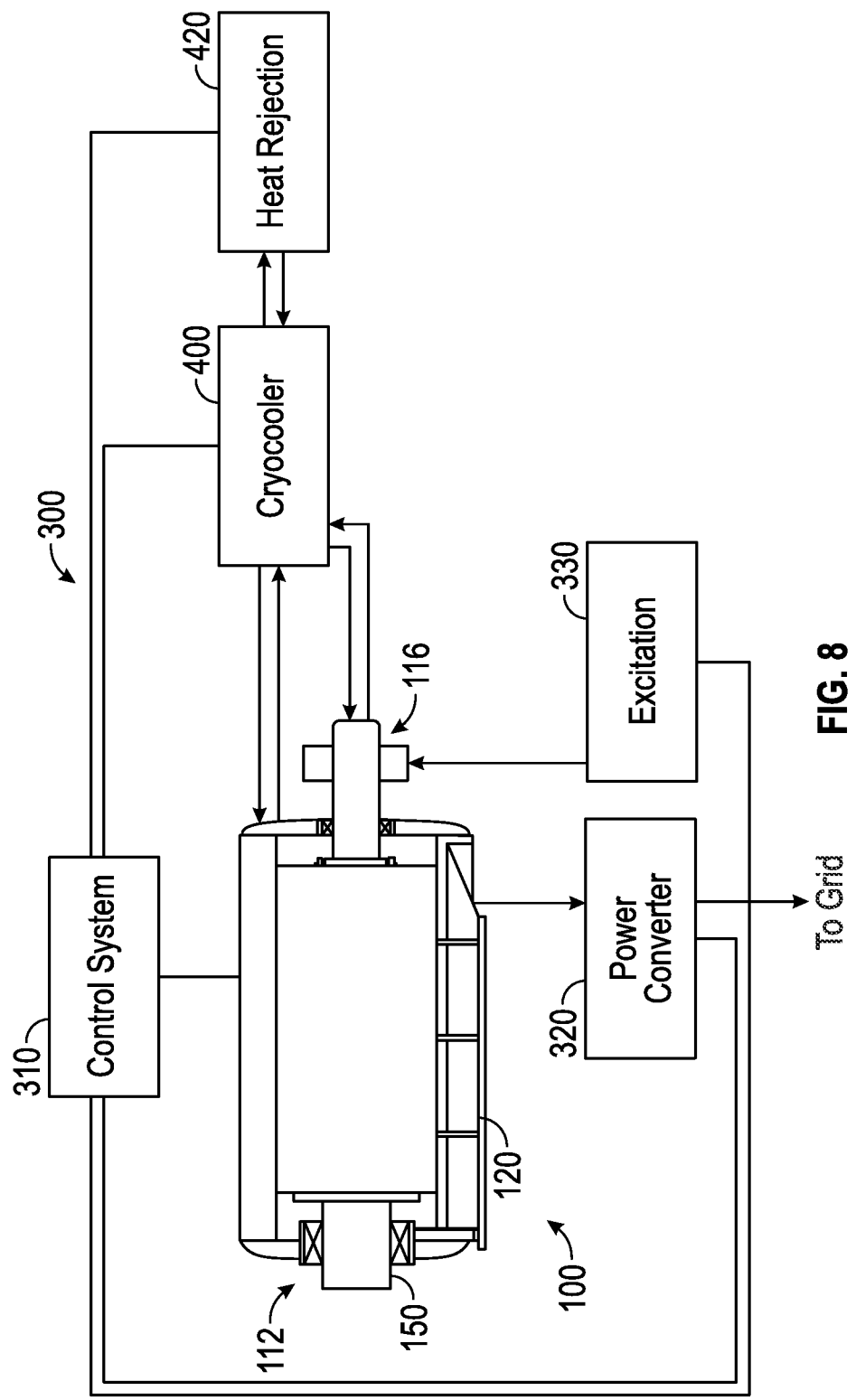
FIG. 8 is a schematic diagram of a system including a superconducting electrical machine in accordance with one embodiment.

Referring to FIG. 8, a system 300 for operating a superconducting electrical machine 100 is shown. The system 300 includes a superconducting electrical machine 100, a control system 310, a power converter 320, an excitation device 330, a cryocooler 400, and a heat rejection unit 420. The control system 310 may control operation of the various components of system 300. For example, the control system 310 may modulate the rotation of a rotor 150, depending on factors including but not limited to the rotation rate of a shaft from a prime mover such as a wind turbine (e.g. shaft 152 shown in FIG. 3; wind turbine 128 shown in FIG. 2).

A cryocooler 400 may control the temperatures and flow rates of coolants provided to a superconducting electrical machine 100, in order to control a temperature of active sections (e.g., rotor active section 154 shown in FIG. 13B, stator active section 162 shown in FIG. 13A, etc.) within the superconducting electrical machine 100. For example, the cryocooler 400 may control a temperature of a stator 160, a temperature of a rotor 150, a temperature of components of the stator 160 or of the rotor 150, etc. The cryocooler 400 may control the flow rates of the coolants in order to maintain a temperature within an active section at or below a superconducting temperature. Temperatures within the superconducting electrical machine 100 may be measured in a variety of ways (e.g., temperatures may be measured using sensors disposed throughout the superconducting electrical machine, etc.).

The power converter 320 may convert electrical energy generated by the superconducting electrical machine 100 to a form compatible with electrical components outside of system 300. For example, the superconducting electrical machine 100 may generate variable frequency power, which must be rectified and inverted before transmission to an electrical grid.

The excitation device 330 may provide an excitation current to the rotor 150 so that the rotor windings 208 of the rotor 150 may generate a magnetic field. In some embodiments, control system 310 controls operation of the excitation device 330 to dynamically modulate the excitation current in response to conditions including but not limited to wind conditions. In some embodiments, a change in the excitation current leads to an inductive voltage, requiring power to be supplied from the excitation device 330 to the superconducting electrical machine 100. In some embodiments, the excitation current is modulated over long time constants (e.g., several minutes) in response to conditions including but not limited to wind conditions and/or for providing variable speed operation.

The cryocooler 400 may be coupled to a superconducting electrical machine 100, and the cryocooler 400 may drive a cooling cycle, such as a reverse-Brayton cycle, in order to provide coolants to the superconducting electrical machine 100. The coolants may pass from the cryocooler 400, which has cooled the coolants to a temperature at or below a superconducting temperature, through cooling tubes in the active sections of a rotor 150 and a stator (e.g., stator 160 shown in FIG. 7; rotor cooling tubes 220 and stator cooling tubes 224 shown in FIGS. 9A-9B). The coolants may draw thermal energy from the active sections, and particularly the superconductors of the rotor 150 and the stator 160 (e.g. rotor windings 216 and stator windings 228 showing in FIGS. 13A-13B). By drawing thermal energy from the active sections, the coolants help maintain the superconductors at a superconducting temperature. After drawing thermal energy from the active sections, the relatively warm coolant may return to the cryocooler 400, and the cycle may begin again.

In some embodiments, the coolant includes gaseous helium. Cryocooler 400 may include a Turbo-Brayton cryocooler which provides a coolant of helium (e.g., helium gas having a temperature of approximately 15-20 Kelvin, etc.) at a superconducting temperature, to a rotor 150 and to a stator (e.g., stator 160 shown in FIG. 7). Cryocooler 400 may also provide a coolant of helium as an additional heat sink to the stator 160 (e.g., helium gas having a temperature of 60 Kelvin, etc.).

Referring to FIGS. 9A-9B, a section of a superconducting electrical machine 100 is shown. In some embodiments, a rotor (e.g., rotor 150 shown in FIG. 7) includes a rotor torque tube 200 surrounded by a rotor composite 208. The rotor composite 208 may include an epoxy resin and filler configured to compensate for a volume change of the rotor. The rotor composite 208 may surround and support rotor windings 216. Rotor cooling tubes 220 may be disposed between the rotor torque tube 200 and the rotor windings 216 in order to draw thermal energy from the rotor windings 216. An air gap 184 may be provided between the rotor 150 and a stator (e.g., stator 160 shown in FIG. 7), when the rotor is positioned within a cavity 20 defined by the stator 160. The stator 160 may be disposed coannular with the rotor 150 and on an opposite side of the air gap 184. The stator 160 may include stator cooling tubes 224 to draw thermal energy from stator windings 228. A stator composite 232 may surround and support the stator windings 228. An electromagnetic shield 190 may be provided along an outer region of the stator 160 to provide magnetic isolation for the superconducting electrical machine 100.

The rotor composite 208 may be surrounded by a rotor retention layer 212. The rotor retention layer 212 may provide additional structural support to the rotor 150 during a change in temperature from a first temperature to a second temperature, and may also provide additional structural support to the rotor 150 during operation of the superconducting electrical machine 100.

Figure 10:
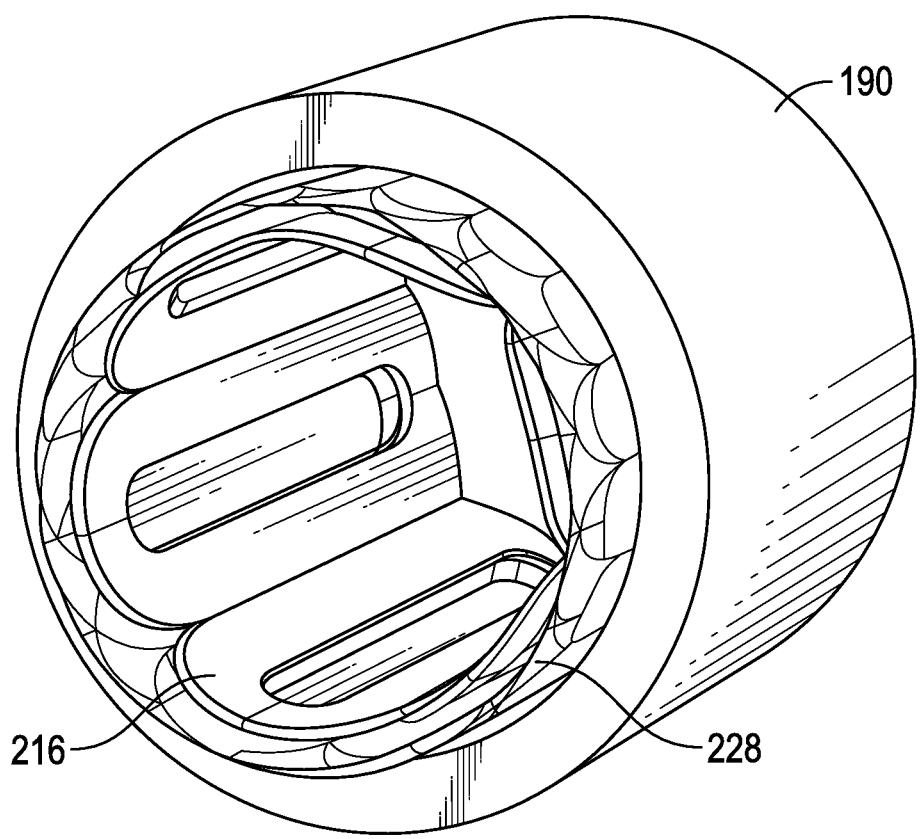
FIG. 10 is a perspective view of the active section and rotor windings and stator windings of a superconducting electrical machine in accordance with one embodiment.

Referring to FIG. 10, a superconducting electrical machine 100 including active sections in which superconducting processes occur is shown. The superconducting electrical machine 100 includes an electromagnetic shield 190. The active sections include stator windings 228. The superconducting electrical machine 100 also includes a rotor (e.g. rotor 150 shown in FIG. 7) including rotor windings 216. In some embodiments, superconductors, such as rotor windings 216 and stator windings 228, are arranged in a multiple-pole configuration. For example, in FIG. 10, rotor windings 216 are shown in a six-pole configuration. In various embodiments, superconductors may be arranged in various configurations (e.g. 2 poles, 4 poles, 10 poles, etc.). In some embodiments, the superconducting windings, such as rotor windings 216 and stator windings 228, may be arranged in layers. For example, in FIG. 10, the stator windings 228 are shown in a three-layer arrangement.

Figure 11:
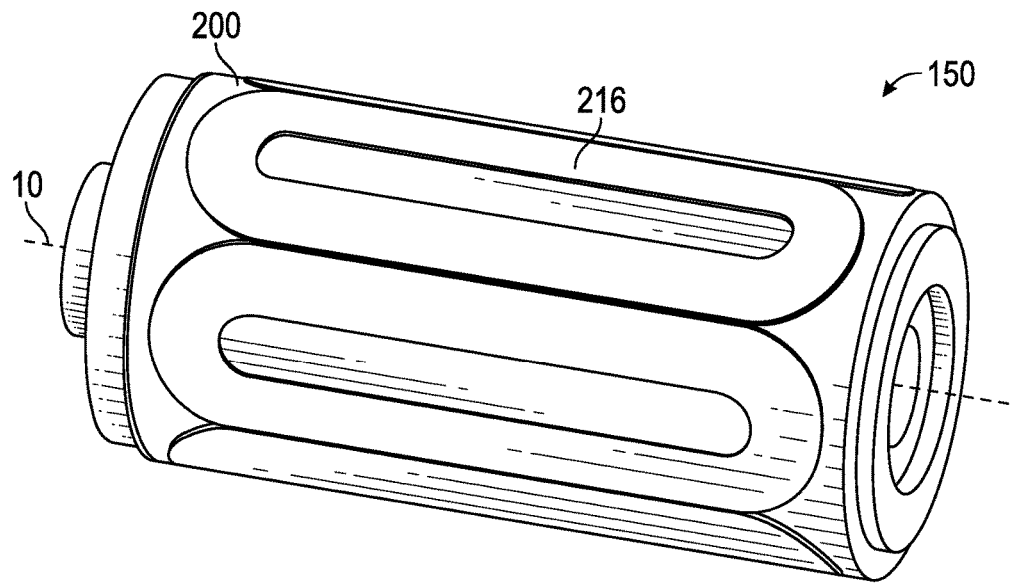
FIG. 11 is a perspective view of the active section of a rotor showing the winding placement for a superconducting electrical machine in accordance with one embodiment.

Referring to FIG. 11, a portion of a rotor 150 is shown. The rotor 150 may rotate about a longitudinal axis 10. The rotor 150 may include a rotor torque tube 200. The rotor torque tube 200 may be coannular with and surround an outer surface of a shaft (e.g., shaft 152 shown in FIG. 3), and may transfer mechanical rotational energy from the shaft to a rotor active section that is coannular with and surrounds an outer surface of the torque tube 200. The rotor active section may include a rotor composite (e.g., rotor composite 208 shown in FIG. 9A) which supports rotor windings 216. Rotor cooling tubes (e.g., rotor cooling tubes 220 shown in FIG. 13B) may be disposed along a surface of the rotor composite 208, allowing for heat transfer from the rotor active section to coolants passing through the rotor cooling tubes 220.

Figure 12:
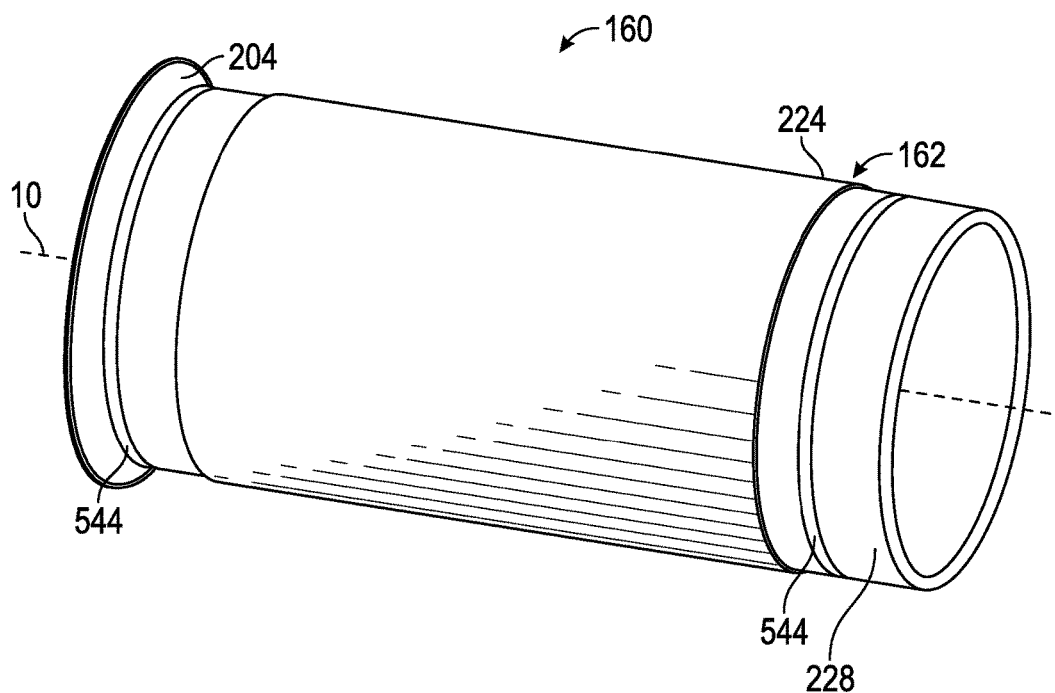
FIG. 12 is a perspective view of the active section and outer layers of a stator of a superconducting electrical machine in accordance with one embodiment.

Referring to FIG. 12, a portion of a stator 160 is shown. The stator 160 may be coannular with a longitudinal axis 10. The stator 160 may include an active section 162 including a stator composite which supports stator windings (e.g., stator composite 232, stator windings 228 shown in FIG. 13A). Stator cooling tubes 224 may be disposed along a surface of the stator composite 232, allowing for heat transfer from the active section 162 to coolants passing through the stator cooling tubes 224. In some embodiments, heat sink rings 544 are disposed along an outer circumference of the stator 160, in order to provide a flow of coolants at a temperature that is greater than the temperature of the coolants passing through the cooling tubes 224. In some embodiments, the coolants passing through the heat sink rings 544 include helium gas at a temperature of 60 Kelvin.

Referring to FIG. 13A, various layers of a stator (e.g., stator 160 shown in FIG. 7) are shown. In some embodiments, the stator 160 includes a stator torque tube 204 supporting a stator active section 162. A stator composite 232 supports embedded stator windings 228. A stator retention layer 212 may be disposed along an outer surface of the stator composite 232 and may provide additional structural support to the stator 160 during a change in temperature from a first temperature to a second temperature, as well as during operation of the superconducting electrical machine 100. Stator cooling tubes 224 may be disposed along a surface of the stator composite 232, in order to provide a flow of coolants at or below a superconducting temperature. A stator retention layer 212 may be disposed along an outer surface of the stator composite 232 and/or stator active section 162 in order to provide additional structural support to the stator 160 during a change in temperature from a first temperature to a second temperature, as well as during operation of the superconducting electrical machine 100.

Referring to FIG. 13B, various layers of a rotor (e.g., rotor 150 shown in FIG. 7) are shown. In some embodiments, the rotor 150 includes a rotor torque tube 200 supporting a rotor active section 154. A rotor composite 208 supports rotor windings 216. A rotor retention layer 212 may be disposed along an outer surface of the rotor composite 208 and/or stator active section 154 and may provide additional structural support to the rotor 150 during a change in temperature from a first temperature to a second temperature, as well as during operation of the superconducting electrical machine 100 at or below a superconducting temperature. Rotor cooling tubes 220 may be disposed between the rotor torque tube 200 and the rotor active section 154 in order to provide a flow of coolants at a temperature at or below a superconducting temperature.

Referring to FIG. 14, a rotor 150 is shown. Rotor re-entrant drive end 172 provides an extended path along which thermal conduction may proceed between the rotor 150 and an environment surrounding superconducting electrical machine 100. Rotor cooling tubes 220 may be provided along an outer surface of a rotor torque tube 200. In some embodiments, rotor cooling tubes 220 are arranged in a tightly wound configuration in order to maximize the surface area between the rotor cooling tubes 220 and rotor composite 208, in order to optimize the rate of heat transfer from the rotor windings 216 to the coolant passing through the rotor cooling tubes 220.

In some embodiments, a rotor 150 includes rotor windings 216 configured to superconduct at or below a superconducting temperature. A re-entrant end, such as rotor re-entrant end 172, is disposed between a shaft (e.g., shaft 152 shown in FIG. 3) and a rotor torque tube 200. The rotor torque tube 200 is disposed between the rotor windings 216 and the re-entrant end 172. The re-entrant end 172 increases a resistance to heat transfer between the shaft 152 and the rotor windings 216. For example, the re-entrant end 172 may increase a length of a pathway along which conduction of thermal energy must occur from the shaft 152 to the rotor windings 216. An insulator may be placed along surfaces of the re-entrant end 172 to mitigate heat transfer by radiation, and a vacuum environment may be provided by a cryostat in order to minimize heat transfer by convection.

Figure 15A:
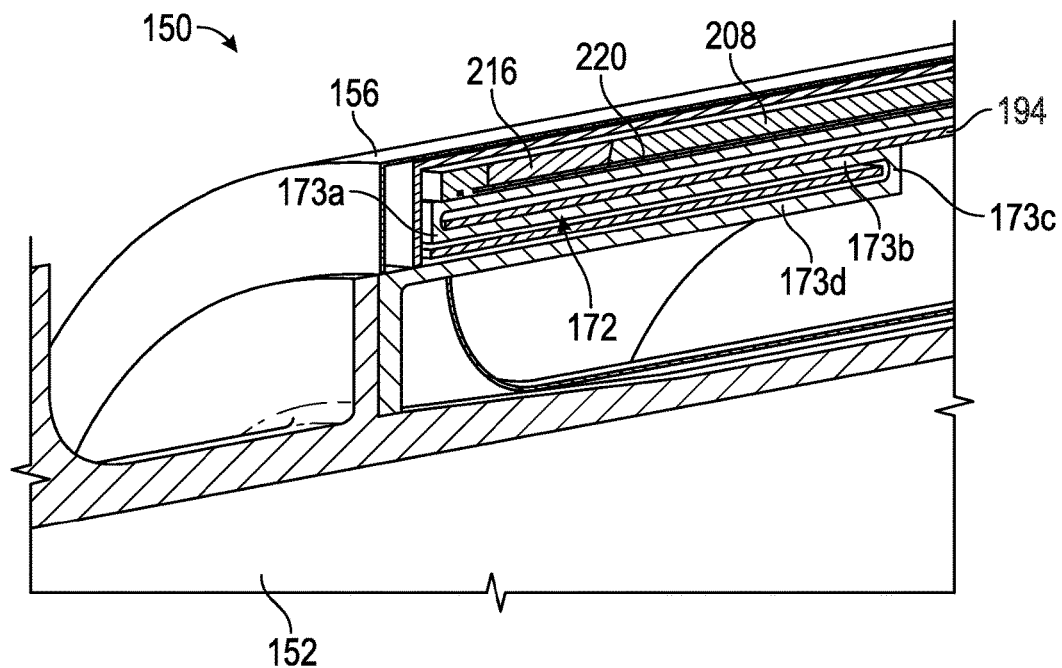
FIG. 15A is a partial view of a rotor of a superconducting electrical machine in accordance with one embodiment.

Referring to FIG. 15A, a portion of a rotor 150 is shown in the drive end 112 region. The rotor 150 includes a rotor cryostat 156 for maintaining a vacuum environment in the rotor 150. The rotor 150 also includes a re-entrant drive end 172 attaching a shaft 152 to a rotor active section 154, the rotor active section 154 including a rotor torque tube 200, rotor windings 216 disposed within a rotor composite 208, rotor cooling tubes 220, a rotor retention layer 212, etc. In some embodiments, the re-entrant end 172 includes a plurality of rotor segments 173.

In some embodiments, a plurality of rotor segments 173 form multiple passes. In some embodiments, at least two of the plurality of rotor segments 173 are substantially parallel to each other, to a rotor torque tube 200, and to a longitudinal axis (e.g., longitudinal axis 10 shown in FIG. 3). For example, as shown in FIG. 15A, two of the plurality of rotor segments 173b, 173d are substantially parallel to each other, to the rotor torque tube 200, and to the longitudinal axis 10 (e.g., two components such as rotor segments are substantially parallel if they do not intersect; if an angle between two vectors passing through the two segments is between 150 and 210 degrees; if an angle between two vectors passing through the two segments is between 170 and 190 degrees; etc.). In some embodiments, a re-entrant end 172 having multiple passes effectively provides an extended pathway along with thermal conduction occurs, without significantly increasing the length of a shaft 152. As such, the performance of the shaft 152 in transferring torque to the rotor torque tube 200 and rotor active section 154 is improved; axial stresses generated by thermal contraction in the shaft 152 are minimized; the ability of the shaft 152 to manage bending loads is improved; etc. In some embodiments, an insulator 194 (e.g., multi-layer insulation, etc.) is disposed at least partially along surfaces of the plurality of segments 173, in order to mitigate or prevent heat transfer between surfaces of the plurality of segments 173 and/or between surfaces of the plurality of segments 173 and the rotor torque tube 200. The insulator 194 may be disposed along a surface of the rotor torque tube 200. Although the figures illustrate the insulator 194 in specific locations, the insulator 194 may preferentially be disposed along a variety of surfaces, such as surfaces of a rotor active section (see, e.g., rotor active section 154 shown in FIG. 13B), in order to minimize heat transfer to the rotor active section 154 from other surfaces with greater temperatures. The insulator 194 may preferentially be disposed along surfaces within the rotor 150 that are in thermal communication with other surfaces having greater temperatures. The insulator 194 may be disposed along surfaces that would otherwise have line of sight to surfaces at room temperature, in order to mitigate radiative heat transfer. The insulator 194 may be multi-layer insulation. The insulator 194 may improve the ability of the superconducting electrical machine 100 to maintain a desired temperature by reducing or eliminating heat transfer by radiation between surfaces of the rotor segments. In some embodiments, the vacuum environment provided by a cryostat, such as a rotor cryostat 156, supplements the performance of the multi-layer insulation. In some embodiments, the insulator 194 mitigates or prevents heat transfer by thermal convection or thermal radiation between surfaces of the rotor segments. In some embodiments, the multi-layer insulation has an effective thermal conductivity of approximately 0.1 [milliWatt/meter-Kelvin]. In some embodiments, multi-layer insulation disposed on a surface cooperates with an adjacent vacuum to significantly reduce heat transfer from the surface to another surface.

Figure 15B:
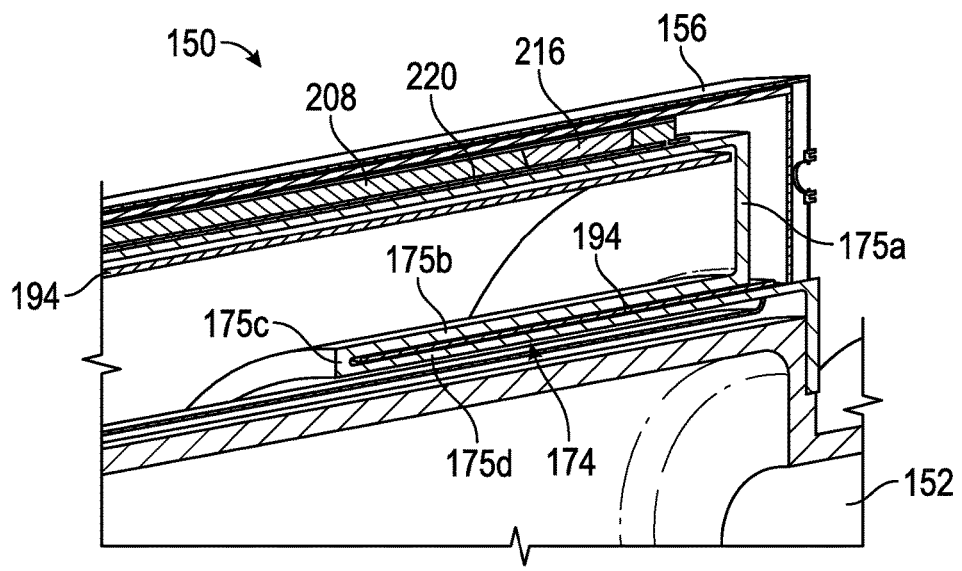
FIG. 15B is a partial view of a rotor of a superconducting electrical machine in accordance with one embodiment.

Referring to FIG. 15B, a portion of a rotor 150 is shown in the non-drive end 116 region. The rotor 150 includes a rotor cryostat 156 for maintaining a vacuum environment in the rotor 150. The rotor 150 also includes a re-entrant non-drive end 174 attaching a shaft 152 to a rotor active section 154, the rotor active section 154 including a rotor torque tube 200, rotor windings 216 disposed within a rotor composite 208, rotor cooling tubes 220, a rotor retention layer 212, etc. In some embodiments, the re-entrant end 174 includes a plurality of rotor segments 175.

In some embodiments, the plurality of rotor segments 175 form multiple passes. In some embodiments, at least two of the plurality of rotor segments 175 are substantially parallel to each other, to a rotor torque tube 200, and to a longitudinal axis (e.g., longitudinal axis 10 shown in FIG. 3). For example, as shown in FIG. 15B, two of the plurality of rotor segments 175b, 175d may be substantially parallel to each other, to the rotor torque tube 200, and to the longitudinal axis 10. In some embodiments, a re-entrant end 174 having multiple passes effectively provides an extended pathway along with thermal conduction occurs, without increasing the length of the shaft 152. As such, the performance of the shaft 152 in transferring torque to the rotor torque tube 200 and rotor active section 154 is improved; axial stresses generated by thermal contraction in the shaft 152 are minimized; the ability of the shaft 152 to manage bending loads is improved; etc. In some embodiments, an insulator 194 (e.g., multi-layer insulation, etc.) is disposed at least partially along surfaces of the plurality of segments 175, in order to mitigate or prevent heat transfer between surfaces of the plurality of segments 175 and/or between surfaces of the plurality of segments 175 and the rotor torque tube 200.

In some embodiments, the long pathway for conduction of thermal energy provided by the re-entrant ends 172, 174 allows for standard stationary bearings to be used to support the rotor 150. The long pathway ensures that a rate of heat transfer from exterior portions of the superconducting electrical machine 100, such as a drive end 112 region of the rotor 150 or a non-drive end 116 region of the rotor 150, is sufficiently low so as to minimize the cooling load required to maintain the temperature of superconductors (e.g., rotor windings 216, etc.) at or below a superconducting temperature. The long pathway also prevents communication of low temperature conditions in a center of the rotor 150 to the drive end 112 region or the non-drive end region 116, minimizing axial stresses in a shaft (e.g., shaft 152 shown in FIG. 3) due to thermal contraction, which allows for standard stationary bearings to be used.

As shown in the figures and described in the written description, a superconducting electrical machine 100 may be fully superconducting: both a rotor 150 and a stator 160 are capable of operating in a superconducting fashion, as rotor windings 216 and stator windings 228 are each able to superconduct when maintained at a temperature no greater than a superconducting temperature. In other embodiments, a superconducting electrical machine may be partially superconducting. For example, just a rotor, or just a stator, may be configured to superconduct. In some embodiments, only one of a rotor or a stator may be provided with a composite such as rotor composite 208 or stator composite 232. In some embodiments, only one of a rotor 150 or a stator 160 may be provided with cooling tubes, such as rotor cooling tubes 220 or stator cooling tubes 224, in order to maintain respective superconductors at or below a superconducting temperature.

The construction and arrangement of the systems and methods as shown in the various exemplary embodiments are illustrative only. Although only a few embodiments have been described in detail in this disclosure, many modifications are possible (e.g., variations in size, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A rotor configured to rotate about a longitudinal axis, the rotor comprising:
   a rotor torque tube;
   a drive end region;
   a non-drive end region;
   a shaft disposed along the longitudinal axis and extending entirely through the rotor torque tube;
   a first re-entrant end attached to the shaft and to the rotor torque tube, the first re-entrant end including a first rotor segment attached to the shaft and extending substantially parallel to the longitudinal axis, a second rotor segment attached to the first rotor segment, and a third rotor segment attached to the second rotor segment and the rotor torque tube, the third rotor segment extending substantially parallel to the first rotor segment, the third rotor segment spaced from the first rotor segment; and
   a second re-entrant end attached to the shaft and to the rotor torque tube, wherein the first re-entrant end is disposed proximate to the drive end region, and the second re-entrant end is disposed proximate to the non-drive end region,
   wherein at most a threshold fraction of a bending load applied to the shaft is communicated to a rotor active section comprising the rotor torque tube.

2. The rotor of claim 1, wherein the first re-entrant end is disposed adjacent to a rotor cryostat, and the second re-entrant end is disposed adjacent to the rotor cryostat.

3. The rotor of claim 1, further comprising a winding configured to superconduct when at or below a superconducting temperature, wherein the rotor torque tube is disposed between the winding and the shaft, and wherein the re-entrant drive end increases a resistance to heat transfer between the shaft and the winding.

4. The rotor of claim 1, wherein a first point of the re-entrant drive end is at a room temperature, and a second point of the re-entrant drive end is at a superconducting temperature.

5. A superconducting electrical machine, comprising:
   a stator disposed coannular with a longitudinal axis, the stator defining a cavity;
   a rotor configured to rotate about the longitudinal axis and disposed at least partially within the cavity, the rotor comprising:
      a rotor active section comprising a rotor torque tube and a superconductor;
      a drive end region;
      a non-drive end region;
      a shaft configured to rotate with the rotor and extending entirely through the rotor torque tube; and
      a first re-entrant end attached to the shaft and to the rotor active section, the first re-entrant end including a first rotor segment attached to the shaft and extending substantially parallel to the longitudinal axis, a second rotor segment attached to the first rotor segment, and a third rotor segment attached to the second rotor segment and the rotor torque tube, the third rotor segment extending substantially parallel to the first rotor segment, the third rotor segment spaced from the first rotor segment; and
      a second re-entrant end attached to the shaft and to the rotor torque tube, wherein the first re-entrant end is disposed proximate to the drive end region, and the second re-entrant end is disposed proximate to the non-drive end region,
   wherein at most a threshold fraction of a bending load applied to the shaft is communicated to the rotor active section.

6. The superconducting electrical machine of claim 5, wherein the first re-entrant end is disposed adjacent to a rotor cryostat, and the second re-entrant end is disposed adjacent to the rotor cryostat.

7. The superconducting electrical machine of claim 5, further comprising a pair of bearings disposed at the drive end region and the non-drive end region, the pair of bearings being configured to support the shaft and accommodate rotation of the shaft.

8. The superconducting electrical machine of claim 5, further comprising a winding configured to superconduct when at or below a superconducting temperature, wherein the rotor torque tube is disposed between the winding and the shaft, and wherein the re-entrant drive end increases a resistance to heat transfer between the shaft and the winding.

9. A system for generating electricity, comprising:
   a prime mover configured to rotate a shaft about a longitudinal axis; and
   a superconducting electrical machine, comprising:
      a stator disposed coannular with the longitudinal axis, the stator defining a drive end region and a non-drive end region, the stator including a stator frame, a first bracket assembly disposed at the drive end region, and a second bracket assembly disposed at the non-drive end region, the bracket assemblies configured to receive the shaft; and
      a rotor configured to rotate about the longitudinal axis, the rotor comprising the shaft, a rotor torque tube, and a rotor active section disposed surrounding and coannular with a rotor torque tube, the shaft extending entirely through the rotor torque tube, wherein a first re-entrant end is attached to the shaft and the rotor active section, a second re-entrant end is attached to the shaft and the rotor active section, the first re-entrant end is disposed proximate to the drive end region, and the second re-entrant end is disposed proximate to the non-drive end region;
   wherein at most a threshold fraction of a bending load applied to the shaft by the prime mover is communicated to the rotor active section.

10. The system of claim 9, wherein the prime mover is a wind turbine.

11. The system of claim 9, wherein the shaft is configured to rotate at a rate greater than zero revolutions per minute and less than 100 revolutions per minute.

12. The system of claim 9, wherein the re-entrant end comprises a plurality of segments, wherein at least two of the plurality of segments are substantially parallel to each other.

13. The system of claim 9, wherein the first re-entrant end is disposed adjacent to a rotor cryostat, and the second re-entrant end is disposed adjacent to the rotor cryostat.

14. The system of claim 9, further comprising a first bearing disposed within the first bracket assembly and a second bearing disposed within the second bracket assembly, the pair of bearings being configured to support the shaft and accommodate rotation of the shaft.

15. The system of claim 9, wherein the re-entrant end is configured to compensate for a volume change of the rotor due to a change in temperature from a first temperature to a second temperature.

* * * * *